United States Patent [19]

Fasano

[11] Patent Number: 5,135,568
[45] Date of Patent: Aug. 4, 1992

[54] METHOD FOR IMPROVING FLUORESCENT COATINGS

[75] Inventor: David M. Fasano, Maple Glen, Pa.

[73] Assignee: Rohm and Haas Company, Philadelphia, Pa.

[21] Appl. No.: 647,858

[22] Filed: Jan. 30, 1991

[51] Int. Cl.$^5$ .......................... C09D 5/22; C09D 11/00
[52] U.S. Cl. ...................................... 106/20; 428/402; 427/157; 427/222; 252/301.16; 252/301.35
[58] Field of Search ...................... 106/20; 252/301.16, 252/301.36; 427/157; 428/402

[56] References Cited

U.S. PATENT DOCUMENTS

| | | | |
|---|---|---|---|
| 3,669,899 | 6/1972 | Vassiliades et al. | 106/409 |
| 3,784,391 | 1/1974 | Kurse et al. | 106/170 |
| 3,816,169 | 6/1974 | Vassiliades et al. | 106/409 |
| 4,427,836 | 1/1984 | Kowalski et al. | 525/301 |
| 4,469,825 | 9/1984 | Kowalski et al. | 523/201 |
| 4,594,363 | 6/1986 | Blankenship et al. | 521/64 |
| 4,829,102 | 5/1989 | Biale | 523/201 |
| 4,880,842 | 11/1989 | Kowalski et al. | 521/64 |
| 4,908,391 | 3/1990 | Melber et al. | 521/57 |

FOREIGN PATENT DOCUMENTS

| | | |
|---|---|---|
| 43593 | 8/1984 | Japan . |
| 131637 | 5/1988 | Japan . |
| 2224737 | 11/1989 | United Kingdom . |

OTHER PUBLICATIONS

J. W. Hook and R. E. Harren, "Opaque Polymers," Organic Coatings—Science and Technology, vol. 7 (New York: Marcel Dekker, Inc., 1984), pp. 299-315.

J. W. Hook, et al., "Wet Hiding in Paints Containing Opaque Polymer Modifiers", Resin Review, XXXVI, No. 3, 3-7 (1986).

D. M. Fasano et al., "Formulating High PVC Paints with Opaque Polymer Additives," Resin Review, XXXVII, No. 2, 21-31 (1987).

J. T. Brown et al., "Gaining an Edge in Coating Publication Papers," Resin Review, XXXVII, No. 2, 14-19 (1987).

W. J. Gozdan et al., "Confirming the Exterior Durability of Ropaque OP-62 Opaque Polymer," Resin Review, XXXIX, No. 2, 15-24 (1987).

D. M. Fasano, "Use of Small Polymeric Microvoids in Formulating High PVC Paints," J. Coat. Tech., 59, No. 752, 109-116 (Sep. 1987).

Primary Examiner—William R. Dixon, Jr.
Assistant Examiner—Margaret V. Einsmann

[57] ABSTRACT

A method is provided for improving the optical performance of fluorescent coatings. The appearance of fluorescent coatings is improved by the use of hollow polymer particles which scatter ultraviolet light and shorter wavelength visible light. These hollow polymer particles may be employed as an additive in a fluorescent coating, as an additive in a basecoat onto which a conventional fluorescent coating is applied, or as an additive in both the fluorescent coating and the basecoat onto which the fluorescent coating is applied.

19 Claims, No Drawings

METHOD FOR IMPROVING FLUORESCENT COATINGS

FIELD OF THE INVENTION

This invention is related to fluorescent coatings, and more particularly to a method for improving the appearance of fluorescent coatings through the use of hollow polymer particles that scatter ultraviolet light and shorter wavelength visible light.

BACKGROUND OF THE INVENTION

Fluorescent coatings, such as for example fluorescent paints and inks, are aesthetically desirable in certain applications, such as for example where safety or decorative purposes are important, because of the high degree of visibility generated by the intensity of the fluorescent pigment colors. These fluorescent pigments exhibit their bright colors under daylight conditions as well as under fluorescent and mercury lamps. The appearance of fluorescent coatings is the result of the absorption and re-emission of light by the fluorescing pigment. A problem with fluorescent coatings has been their poor covering power. Light tends to pass through the fluorescent coatings and is absorbed by the substrate reducing the brightness of the coated article. Conventional light scattering pigments, such as for example, titanium dioxide, zinc oxide, zinc sulfide, zinc carbonate, kaolin, and lithopone can increase the covering or hiding power of coatings, however, when such pigments are incorporated into fluorescent coatings the added whiteness only detracts from the desired high chroma of the fluorescent coating. One proposed solution to this problem has been the application onto the substrate of a first opaque coating or basecoat, onto which the fluorescent coating can subsequently be applied or printed. This solution, however, increases the number of steps and coatings necessary to achieve the desired appearance.

DESCRIPTION OF THE PRIOR ART

Japanese Patent Application Number 63-131637 teaches the use of hollow glass powders or glass balloons in a fluorescent paint or ink. It is taught that fluorescent paints containing these hollow glass powders can eliminate the need for a white basecoat. The hollow glass powders are incorporated into the fluorescent paint at a concentration of from about 5% to 20% by weight and have an average particle size diameter of about 20 microns to 50 microns and a wall thickness of several microns.

British Patent Application GB 2 224 737 teaches a water-based ink composition for writing on neon boards comprising:
(a) at least 30% by weight water
(b) 0.5-50% by weight hollow resin particles
(c) 0.5-30% by weight resin which is film-forming at room temperature; and
(d) 0.5-25% dry weight of aqueous emulsion of at least one nonvolatile or only slightly volatile liquid selected from aliphatic carboxylic acid esters, higher hydrocarbons and higher alcohols.

Markings from the ink composition on transparent glass or plastic panels are intensely brightened when a surface receives incident light perpendicular into the panel.

It is an object of the invention to improve the fluorescence of fluorescent coatings.

It is also an object of the present invention to enhance the degree of fluorescence of fluorescent coatings, such as for example paints and inks, utilizing hollow polymer particles as an additive in fluorescent coatings or in a basecoat therefor.

SUMMARY OF THE INVENTION

A method is provided to improve the fluorescence of fluorescent coatings by the use of hollow polymer particles which do not substantially absorb near ultraviolet light and shorter wavelength visible light. These hollow polymer particles may be employed as an additive in a fluorescent coating, as an additive in a basecoat onto which a conventional fluorescent coating is applied, or as an additive in both a fluorescent coating and a basecoat onto which the fluorescent coating is applied.

DETAILED DESCRIPTION OF THE INVENTION

The hollow polymer particles which are useful in this invention may be made in accordance with and having the properties disclosed in U.S. Pat. Nos. 3,784,391; 4,798,691; 4,908,271; 4,910,229; and 4,972,000; and Japanese Patent Applications 60/223873; 61/62510; 61/66710; 61/86941; 62/127336; 62/156387; 01/185311; and 02/140272. The preferred hollow polymer particles and their method of manufacture are disclosed in U.S. Pat. Nos. 4,427,836; 4,469,825; 4,594,363; and 4,880,842. The disclosures therein related to the manufacture and composition of the hollow polymer particles are incorporated herein by reference.

While these hollow polymer particles provide hiding or covering power to coatings in much the same manner as opacifying pigments, such as for example titanium dioxide ($TiO_2$) and zinc oxide, they also exhibit a significantly different behavior when a coating containing them is exposed to ultraviolet light (UV). Unlike conventional opacifying pigments, these hollow polymer particles do not substantially absorb light which normally excites fluorescent pigments, such as ultraviolet light and shorter wavelength visible light. As a result of this phenomenon these hollow polymer particles permit a greater flux of ultraviolet light and shorter wavelength visible light in a coating and in the case of a coating which contains a fluorescent additive improve the fluorescence of the coating compared with conventional opacifying pigments.

Under light of visible wavelengths, fluorescent paints formulated with titanium dioxide as an opacifying pigment and paints formulated with hollow polymer particles, at a concentration designed to match the visible light scattering of the conventional paint, are visually similar. However, when these paint films are placed under ultraviolet light illumination, the paints formulated with the hollow polymer particles exhibit a much higher degree of fluorescence.

In addition, the phenomenon is applicable with any fluorescent additive, such as for example pigments and dyes, which are initially excited by ultraviolet light and visible light with a wavelength less than about 500 nanometers (nm), preferably less than about 450 nanometers. The fluorescent pigments and dyes which exhibit this effect in coatings containing the hollow polymer particles include, for example, DayGlo ™ Fire Orange, DayGlo ™ Saturn Yellow, DayGlo ™ Rocket Red, DayGlo ™ Horizon Blue, pyranine, fluorescein, Rhodomine B and the like.

"Fluorescent coatings" as used herein are coatings which contain a fluorescent additive, such as pigment and dye, and include but are not limited to paints, inks, leather coatings, adhesives, films and the like.

The hollow polymer particles are useful in fluorescent coatings from about 1% by weight to about 90% by weight of the formulation solids. Levels less than about 1% by weight of the formulation solids do not provide sufficient opacity. Levels greater than about 90% by weight of the formulation solids interfere with film formation. Levels of hollow polymer particles from about 5% by weight to about 50% by weight of the formulation solids are preferred.

The hollow polymer particles useful in fluorescent coatings have particle size diameters of from about 0.07 microns to about 4.5 microns, preferably from about 0.1 microns to about 3.5 microns. Hollow polymer particles with a void diameter of from about 0.05 microns to about 3.0 microns are useful.

The method of the invention may be practiced by:
(1) adding the hollow polymer particles directly into the fluorescent coating;
(2) adding the hollow polymer particles into a basecoat for the substrate onto which is subsequently applied a conventional fluorescent coating; or
(3) adding the hollow polymer particles into both the basecoat and conventional fluorescent coating.

Incorporation of the hollow polymer particles directly into the fluorescent coating eliminates the need for additional coatings to obtain good opacity and fluorescence.

In addition, conventional coating components such as, for example, pigments, binders, vehicles, extenders, dispersants, surfactants, coalescents, wetting agents, rheology modifiers, thickeners, drying retarders, antifoaming agents, colorants, waxes, preservatives, heat stabilizers, solvents, anti-skinning agents, driers and the like may be used in this invention.

The hollow polymer particles may also be added to obtain the enhanced fluorescent effect in other materials, such as plastics and other molded articles, which utilize fluorescent additives.

Fluorescence Measurement

Analysis was performed on small pieces (1 cm × 2 cm) cut from the black portion of a opacity chart for the fluorescent paint coatings. Analysis was performed on a black vinyl chart for the basecoat paint coatings.

Fluorescence spectra of the paint specimens were obtained using the Spex Fluorolog II ® Spectrofluorometer used in conjunction with a Spex Model DM1B Data Analyzer. A 150 Watt Xenon lamp was used for the excitation source for ultraviolet and visible wavelength regions. Steady state emission spectra were obtained by holding the excitation wavelength constant while scanning the emission at longer wavelengths. Emitted light was detected using a photomultiplier with an operating voltage of −900 volts and a Spex Model DM102 Photon Counting Acquisition Module. The intensity (measured in photons per second) was recorded at intervals of 0.5 nanometers. Paint specimens were examined using front face illumination: the exciting light impinged upon the paint squares at an angle roughly 45° to the normal of the sample surface, and the signal was collected at 22° relative to the excitation source. Slits were varied between sample sets from 0.5 mm to 1.25 mm as necessary such that the detected signal was kept in the linear range of the photomultiplier tube response.

A steady state emission spectrum was collected for each paint sample using an ultraviolet and visible wavelength. From each spectrum, the wavelength at which the maximum intensity occurred and the corresponding intensity at this wavelength ($I_{max}$) were determined. Data were collected successively in pairs, with each pair consisting of the hollow polymer particle paint (basecoat or fluorescent coating) and its $TiO_2$ control. The reported fluorescence enhancement is computed as the ratio of the measured maximum intensity of the hollow polymer particle paints samples to the maximum intensity of the $TiO_2$ controls at the same maximum wavelength: $I_{max\ (hollow\ polymer)} / I_{max\ (TiO2)}$. This intensity ratio was measured for both ultraviolet excitation (375 nm) and visible excitation (500 nm). These wavelengths were chosen as typical for the spectral regions of interest.

The following examples are intended to illustrate the invention; they are not intended to limit the invention as other applications of the invention will be obvious to those of ordinary skill in the art.

EXAMPLE 1

Preparation of Paint Formulations without Colorants

Three types of paints were initially formulated:
FORMULATION 1: Paint containing only hollow polymer particles as opacifying pigment
FORMULATION 2: Paint containing only titanium dioxide ($TiO_2$) as opacifying pigment (COMPARATIVE)
FORMULATION 3: Paint containing no hollow polymer particles or titanium dioxide ($TiO_2$) as opacifying pigment (COMPARATIVE)

Note: All quantities of ingredients are listed in Table 1.1.

To a 1 pint plastic paint can equipped with a laboratory stirrer, an acrylic latex was added. At moderate agitation, a polycarboxylic acid dispersant was added and mixed. Then the opacifying pigment (either predispersed $TiO_2$ slurry or hollow polymer particles) was added and mixed. Finally water was added and the paint formulation was mixed for an additional 15 minutes.

TABLE 1.1

| | FORMULATION | | |
|---|---|---|---|
| | 1 | 2 Comparative | 3 Comparative |
| Acrylc latex (Rhoplex ® AC-382) (51.8% total solids) | 349.8 | 424.1 | 437.2 |
| Polycarboxylic acid dispersant (Tamol ® 963) (35% total solids) | 1.0 | 1.0 | 1.0 |
| $TiO_2$ slurry (Ti-Pure ® R-900) (76.5% total solids) | — | 31.7 | — |
| Hollow polymer particles (Rapaque ® OP-62) (37.5% total solids) | 79.8 | — | — |
| Water | 7.3 | 0.8 | 1.93 |

NOTE: All quantities in grams

EXAMPLE 2

Preparation of Paint Formuations with Equal Opacity

In order to approximately match the opacity of the formulation containing hollow polymer particles to the formulation containing $TiO_2$, blends of Formulation 2 ($TiO_2$-containing) and Formulation 3 (no $TiO_2$ or hollow polymer particles) were made to ½, ⅓ and 1/6 of the TiO₂ level of Formulation 2. See Table 2.1.

Formulations 2, 3, 4, 5 and 6 were drawn down side by side with Formulation 1 to minimize film thickness differences with a 7 mil Dow bar on Leneta 5C opacity charts and dried at 50% relative humidity and 70° F. overnight.

Contrast ratios were determined by the ratio of the reflectance of each coating over the black portion of the opacity chart to the reflectance of each coating over the white portion of the opacity chart as measured by a Pacific Scientific Colorgard ® 45°/0° Reflectometer. Relative contrast ratios were then determined by the ratio of the contrast ratio of the comparative paints (Comparative Formulations 2-6) to the contrast ratio of Formulation 1. The results are also reported in Table 2.1.

The TiO₂ level at which the plot of the relative contrast ratio versus TiO₂ level for Comparative Formulations 2-6 equals unity (1.000) is the point of approximately equal opacity between Formulation 1 (containing only hollow particles) and a formulation containing TiO₂. This point corresponds to a level of 2.70 weight % TiO2 slurry. In order to obtain a paint formulation with the necessary TiO₂ level, 156.5 grams of Comparative Formulation 2 and 245.6 grams of Comparative Formulation 3 were blended to give COMPARATIVE FORMULATION 7 (no hollow polymer particles).

EXAMPLE 3

Preparation of Paint Formulations with Colorants (Topcoat Paint)

Colorants were added to equal volume aliquots of Formulation 1 and Formulation 7 according to levels in Table 3.1.

TABLE 3.1

|  |  | Formulation | Weight of Formulation (grams) | Colorant | Weight of Colorant (grams) |
|---|---|---|---|---|---|
| Fluorescent Paint 1H |  | 1 | 21.9 | DayGlo ™ Fire Orange | 1.0001ᵃ |
| Fluorescent Paint 1T | Control | 7 | 22.3 | DayGlo ™ Fire Orange | 1.0001ᵃ |
| Fluorescent Paint 2H |  | 1 | 21.9 | DayGlo ™ Saturn Yellow | 1.0000 |
| Fluorescent Paint 2T | Control | 7 | 22.3 | DayGlo ™ Saturn Yellow | 1.0000 |
| Fluorescent Paint 3H |  | 1 | 21.9 | DayGlo ™ Rocket Red | 1.0000 |
| Fluorescent Paint 3T | Control | 7 | 22.3 | DayGlo ™ Rocket Red | 1.0000 |
| Fluorescent Paint 4H |  | 1 | 21.9 | DayGlo ™ Horizon Blue | 1.0000 |
| Fluorescent Paint 4T | Control | 7 | 22.3 | DayGlo ™ Horizon Blue | 1.0000 |
| Fluorescent Paint 5H |  | 1 | 21.9 | Pyranine | 0.1051 |
| Fluorescent Paint 5T | Control | 7 | 22.3 | Pyranine | 0.1051 |
| Fluorescent Paint 6H |  | 1 | 21.9 | Fluorescein | 0.1666 |
| Fluorescent Paint 6T | Control | 7 | 22.3 | Fluorescein | 0.1666 |
| Fluorescent Paint 7H |  | 1 | 21.9 | Rhodomine B* | 0.0797 |
| Fluorescent Paint 7T | Control | 7 | 22.3 | Rhodomine B* | 0.0797 |
| Comparative Paint 8H |  | 1 | 21.9 | Acid Fuschin | 0.2126 |
| Comparative Paint 8T | Control | 7 | 22.3 | Acid Fuschin | 0.2126 |
| Comparative Paint 9H |  | 1 | 21.9 | Cal-Ink Lamp Black | 0.54 |
| Comparative Paint 9T | Control | 7 | 22.3 | Cal-Ink Lamp Black | 0.54 |
| Comparative Paint 10H |  | 1 | 21.9 | Cal-Ink Phthalo Blue | 1.09 |
| Comparative Paint 10T | Control | 7 | 22.3 | Cal-Ink Phthalo Blue | 1.09 |

NOTE:
H - contains hollow polymer particles
T - contains TiO₂
*a purple pigment
ᵃDispersion of 4.0 g Day Glo ™ Fire Orange/10.0 g H₂O/0.10 g Triton ® X-100

| Formulation | Level of TiO₂ Slurry (weight %) | Level of Formulation 2 (grams) | Level of Formulation 3 (grams) | Relative Contrast Ratio |
|---|---|---|---|---|
| 1 | 0.0 | 0.0 | 0.0 | 1.000 (by definition) |
| 2 | 6.93 | 45.0 | 0.0 | 1.333 |
| 3 | 0.0 | 0.0 | 45.0 | 0.157 |
| 4* | 3.53 | 22.88 | 22.01 | 1.114 |
| 5** | 2.37 | 15.25 | 29.34 | 0.934 |
| 6*** | 1.19 | 7.63 | 36.68 | 0.581 |

NOTES:
*Formulation 4 contains ½ the TiO₂ of Formulation 2
**Formulation 5 contains ⅓ the TiO₂ of Formulation 2
***Formulation 6 contains 1/6 the TiO₂ of Formulation 2

EXAMPLE 4

Preparation of Paint Formulations with Colorants (Basecoat Paint)

Formulations 1 and 7 were each drawn down several times with a wire wound rod on black vinyl opacity charts to build a thick layer of paint to ensure good opacity. The draw downs were dried at 50% relative humidity and 70° F. overnight. Both formulations were then coated with commercial fluorescent paints using a 7 mil Dow bar. See Table 4.1. The drawdowns were then dried at 50% relative humidity and 70° F. overnight.

TABLE 4.1

| Coating/Basecoat | System | Basecoat Formulation | Coating Fluorescent Paint |
|---|---|---|---|
| Fluorescent Paint | 11H | 1 | DEKA Permanent Fabric Paint #491 Fluorescent Yellow |
| Fluorescent Paint | 11T Control | 7 | DEKA Permanent Fabric Paint #491 Fluorescent Yellow |
| Fluorescent Paint | 12H | 1 | DEKA Permanent Fabric Paint #492 Fluorescent Orange |

TABLE 4.1-continued

| Coating/Basecoat | System | Basecoat Formulation | Coating Fluorescent Paint |
|---|---|---|---|
| Fluorescent Paint | 12T Control | 7 | DEKA Permanent Fabric Paint #492 Fluorescent Orange |
| Fluorescent Paint | 13H | 1 | DEKA Permanent Fabric Paint #494 Fluorescent Red |
| Fluorescent Paint | 13T Control | 7 | DEKA Permanent Fabric Paint #494 Fluorescent Red |
| Fluorescent Paint | 14H | 1 | DEKA Permanent Fabric Paint #495 Fluorescent Blue |
| Fluorescent Paint | 14T Control | 7 | DEKA Permanent Fabric Paint #495 Fluorescent Blue |
| Fluorescent Paint | 15H | 1 | DEKA Permanent Fabric Paint #496 Fluorescent Green |
| Fluorescent Paint | 15T Control | 7 | DEKA Permanent Fabric Paint #496 Fluorescent Green |

NOTE:
H - contains hollow polymer particles
T - contains $TiO_2$

EXAMPLE 5

Preparation of Ink Formulations

Note: All quantities of ingredients are listed in Table 5.1.

To a container equipped with a laboratory stirrer, the styrene-acrylic alkali-soluble resin neutralized with ammonia was added. At moderate agitation, the predispersed fluorescent pigment and then the emulsified wax were added and mixed. Then the opacifying pigment (either predispersed $TiO_2$ slurry or hollow polymer particles) was added and mixed. Finally water was added and the fluorescent ink was mixed for an additional 15 minutes.

Each fluorescent ink containing hollow polymer particles was drawn down with a #6 wire wound rod on coated clay, bleached white sealed paper and Kraft paper side-by-side with its respective $TiO_2$ control fluorescent ink. The draw downs were dried with a heat gun for 10 seconds. See Table 5.2.

TABLE 5.1

|  | Fluorescent Ink 1 | Fluorescent Ink 1 Control | Fluorescent Ink 2 | Fluorescent Ink 2 Control |
|---|---|---|---|---|
| Styrene-acrylic alkali soluble resin binder neutralized with ammonia (18% solids) | 45.7 grams | 46.1 grams | 44.7 grams | 47.1 grams |
| Pigment Type | DAY-GLO ™ Rocket Red | DAY-GLO ™ Rocket Red | DAY-GLO ™ Saturn Yellow | DAY-GLO ™ Saturn Yellow |
| Pigment Level (50% solids) | 35.4 grams | 37.0 grams | 34.7 grams | 38.0 grams |
| Jonwax ® 26 Emulsified Wax | 5.9 grams | 5.9 grams | 5.7 grams | 6.0 grams |
| Ropaque ® OP-62 (37.5% solids) | 6.3 grams | — | 6.4 grams | — |
| Flexiverse ® Predispersed $TiO_2$ (72% solids) | — | 2.8 grams | — | 2.7 grams |
| Water | 6.6 grams | 8.2 grams | 8.6 grams | 6.3 grams |
| % Total Solids | 30.0 | 30.0 | 29.3 | 31.2 |
| % Pigment | 17.7 | 18.5 | 17.35 | 19.0 |

NOTE:
H - contains hollow polymer particles
T - contains $TiO_2$

TABLE 5.2

| Ink | Opacifier | Type of Paper |
|---|---|---|
| Fluorescent Ink 1A-H | Red | Hollow polymer particles | Clay |
| Fluorescent Ink 1A-T | Red | $TiO_2$ | Clay |
| Fluorescent Ink 1B-H Control | Red | Hollow polymer particles | Sealed |
| Fluorescent Ink 1B-T | Red | $TiO_2$ | Sealed |
| Fluorescent Ink 1C-H | Red | Hollow polymer particles | Kraft |
| Fluorescent Ink 1C-T Control | Red | $TiO_2$ | Kraft |
| Fluorescent Ink 2A-H | Yellow | Hollow polymer particles | Clay |
| Fluorescent Ink 2A-T Control | Yellow | $TiO_2$ | Clay |
| Fluorescent Ink 2B-H | Yellow | Hollow polymer particles | Sealed |
| Fluorescent Ink 2B-T Control | Yellow | $TiO_2$ | Sealed |
| Fluorescent Ink 2C-H | Yellow | Hollow polymer particles | Kraft |
| Fluorescent Ink 2C-T Control | Yellow | $TiO_2$ | Kraft |

NOTE:
H - contains hollow polymer particles
T - contains $TiO_2$
A - clay coated paper
B - bleached white sealed paper
C - Kraft paper

EXAMPLE 6

Fluorescence Measurement

The fluorescence measurements were made as previously described. The results are reported in Table 6.1 for the fluorescent coating paints, in Table 6.2 for the basecoat paints and in Table 6.3 for the fluorescent inks.

TABLE 6.1

| | $I_{max\ (hollow\ polymer)}/I_{max\ (TiO_2)}$ | | Maximum Emission Wavelength (nm) |
|---|---|---|---|
| | UV (375 nm) | Visible (500 nm) | |
| Fluorescent Paint 1 | 5.7 | 0.9 | 594 |
| Repeat | 4.8 | — | 594 |
| Repeat | 6.3 | — | 594 |
| Repeat* | 5.7 | 0.9 | 594 |
| Fluorescent Paint 2* | 5.7 | 1.0 | 510 |
| Fluorescent Paint 3* | 5.0 | 0.9 | 595 |
| Fluorescent Paint 4* | 4.9 | — | 434 |
| Fluorescent Paint 5 | 2.1 | — | 434 |
| Fluorescent Paint 6 | 4.6 | 1.0 | 520 |
| Repeat | 3.8 | — | 520 |
| Fluorescent Paint 7 | 3.0 | 0.8 | 611 |
| Comparative Paint 8 | 1.2 (428 nm) | — | — |
| | 1.5 (635 nm) | 0.8 (635 nm) | — |
| | | 0.8 (650 nm) | — |
| Comparative Paint 9 | 1.3 | — | 428 |
| Comparative Paint 10 | 1.2 | — | 428 |
| Formulation 1/Formulation 7 (Control) | 1.8 | — | 428 |
| Repeat* | 1.8 | — | 428 |

*NOTE: Kubelka-Munk scattering coefficients were determined for Formulations 1 and Comparative Formulations 2–6 to verify that Formulation 1 and Comparative Formulation 7 were of approximately equal opacity. This analysis predicted that 2.77 weight % TiO$_2$ slurry was needed in Comparative Formulation 7 to match the opacity of Formulation 1. This value was used in these formulations and is believed to be essentially equivalent to the formulations with 2.70 weight % TiO$_2$.

TABLE 6.2

| | $I_{max\ (hollow\ polymer)}/I_{max\ (TiO_2)}$ | | Maximum Emission Wavelength (nm) |
|---|---|---|---|
| | UV (375 nm) | Visible (500 nm) | |
| Fluorescent Paint 11 | 1.6 | 1.2 | 520 |
| Fluorescent Paint 12 | 1.6 | 1.2 | 603 |
| Fluorescent Paint 13 | 1.6 | 1.0 | 608 |
| Repeat | 1.3 | — | 608 |
| Fluorescent Paint 14 | 1.1 | — | 444 |
| Repeat | 1.1 | — | 444 |
| Fluorescent Paint 15 | 0.9 | 0.8 | 510 |
| Repeat | 1.3 | — | 510 |

TABLE 6.3

| | $I_{max\ (hollow\ polymer)}/I_{max\ (TiO_2)}$ | |
|---|---|---|
| | UV (375 nm) | Visible (500 nm) |
| Fluorescent Ink 1A | 1.8 | 1.0 |
| Fluorescent Ink 1B | 1.6 | 1.1 |
| Fluorescent Ink 1C | 1.1 | 0.8 |
| Fluoescent Ink 2A* | 0.3 | 0.2 |
| Fluroescent Ink 2B | 1.4 | 1.0 |
| Fluorescent Ink 2C | 1.2 | 1.0 |

*This value may be the result of the contribution of the rough paper surface to the detected signal and the limited opacity of the yellow ink. Repeat measurements confirmed values less than 1.

In Table 6.1, $I_{max}$ ratios greater than 1.8 (Control) indicate enhanced fluorescence. In Table 6.2, $I_{max}$ ratios greater than 1.0 (Control) indicate enhanced fluorescence.

What is claimed is:

1. A method for improving the fluorescence of a coating containing at least one fluorescent additive comprising adding to said coating from about 1% by weight to about 90% by weight of the coating solids of at least one type of hollow polymer particle which scatters ultraviolet light and shorter wavelength visible light where the hollow polymer particles have a particle size diameter of from about 0.07 microns to about 4.5 microns.

2. The method of claim 1 where the hollow polymer particles comprise from about 5% by weight to about 50% by weight of the coating solids.

3. The method of claim 1 where the hollow polymer particles have a void diameter of from about 0.05 microns to about 3.0 microns.

4. The method of claim 1 where the hollow polymer particles have a particle size diameter of from about 0.1 micron to about 3.5 microns.

5. A method for improving the reflectance of a basecoat for use with a coating applied on said basecoat where said coating contains at least one fluorescent additive comprising adding from about 1% by weight to about 90% by weight of the coating solids of at least one type of hollow polymer particle to said basecoat where the hollow polymer particles have a particle size diameter of from about 0.07 microns to about 4.5 microns.

6. The method of claim 5 where the hollow polymer particles comprise from about 5% by weight to about 50% by weight of the basecoat solids.

7. The method of claim 6 where the hollow polymer particles have a void diameter of from about 0.05 microns to about 3.0 microns.

8. The method of claim 6 where the hollow polymer particles have a particle size diameter of from about 0.1 micron to about 3.5 microns.

9. A coating composition comprising from about 1% by weight to about 90% by weight of the coating solids of at least one type of hollow polymer particle which scatters ultraviolet light and shorter wavelength visible light and at least one fluorescent additive which absorbs light with a wavelength less than about 500 nanometers and fluoresces said light where the hollow polymer particles have a particle size diameter of from about 0.07 microns to about 4.5 microns.

10. A paint composition comprising from about 1% by weight to about 90% by weight of the coating solids of at least one type of hollow polymer particle which scatters ultraviolet light and shorter wavelength visible light and at least one fluorescent additive which absorbs light with a wavelength less than about 500 nanometers and fluoresces said light where the hollow polymer particles have a particle size diameter of from about 0.07 microns to about 4.5 microns.

11. An ink composition comprising from about 1% by weight to about 90% by weight of the coating solids of at least one type of hollow polymer particle which scatters ultraviolet light and shorter wavelength visible light and at least one fluorescent additive which absorbs light with a wavelength less than about 500 nanometers and fluoresces said light where the hollow polymer particles have a particle size diameter of from about 0.07 microns to about 4.5 microns.

12. The composition of claim 9 where the fluorescent additive is selected from the group consisting of orange, yellow, red, blue, green and purple pigments.

13. The composition of claim 9 where the hollow polymer particles comprise from about 5% by weight to about 50% by weight of the composition solids.

14. The composition of claim 9 where the hollow polymer particles have a void diameter of from about 0.05 microns to about 3.0 microns.

15. The composition of claim 9 where the hollow polymer particles have a particle size diameter of from about 0.1 microns to about 3.5 microns.

16. A basecoat composition for a coating where said basecoat comprises from about 1% by weight to about 90% by weight of the coating solids of at least one type of hollow polymer particle which scatter ultraviolet light and shorter wavelength visible light where the hollow polymer particles have a particle size diameter of from about 0.07 microns to about 4.5 microns and where said coating comprises at least one fluorescent additive which absorbs light with a wavelength less than about 500 nanometers and fluoresces said light.

17. The composition of claim 16 where the hollow polymer particles comprise from about 5% by weight to about 50% by weight of the composition solids.

18. The composition of claim 16 where the hollow polymer particles have a void diameter of from about 0.05 microns to about 3.0 microns.

19. The composition of claim 16 where the hollow polymer particles have a particle size diameter of from about 0.1 microns to about 3.5 microns.

* * * * *